United States Patent [19]

Kjöller et al.

[11] 3,967,248

[45] June 29, 1976

[54] ARRANGEMENT FOR DOUBLE-WRITING INTO A MEMORY DURING DATA FIELD RELOCATION

[75] Inventors: Hans Ole Kjöller, Vasterhaninge; Erik Ivar Sjöquist, Farsta, both of Sweden

[73] Assignee: Telefonaktiebolaget L M Ericsson, Stockholm, Sweden

[22] Filed: Nov. 29, 1974

[21] Appl. No.: 528,137

[30] Foreign Application Priority Data

Dec. 13, 1973 Sweden.............................. 7316837

[52] U.S. Cl. ............................................ 340/172.5
[51] Int. Cl.² ........................................ G06F 13/00
[58] Field of Search .................................. 340/172.5

[56] References Cited
UNITED STATES PATENTS

| | | | |
|---|---|---|---|
| 3,754,218 | 8/1973 | Hatta ............................. | 340/172.5 |
| 3,778,776 | 11/1973 | Hakozaki ........................ | 340/172.5 |
| 3,787,813 | 1/1974 | Cole ............................... | 340/172.5 |

*Primary Examiner*—Gareth D. Shaw
*Assistant Examiner*—James D. Thomas
*Attorney, Agent, or Firm*—Hane, Baxley & Spiecens

[57] ABSTRACT

The present invention relates to an arrangement for writing identical data into a first and a second memory field in a real-time computer which, while in operation, performs relocation of data from the first memory field to the second wherein the data memory is so arranged that, in response to a write pulse, data is transferred to a memory position defined by simultaneously received address information, the arrangement includes in addition to the normal address register required for writing data into the memory, an additional register for storing the address separation between the two memory fields as well as further means for writing the data sequentially into, on the one hand, a memory location defined by an address stored in the address register and, on the other hand, in a memory location defined by the sum of such stored address and the address separation stored in the additional register.

3 Claims, 1 Drawing Figure

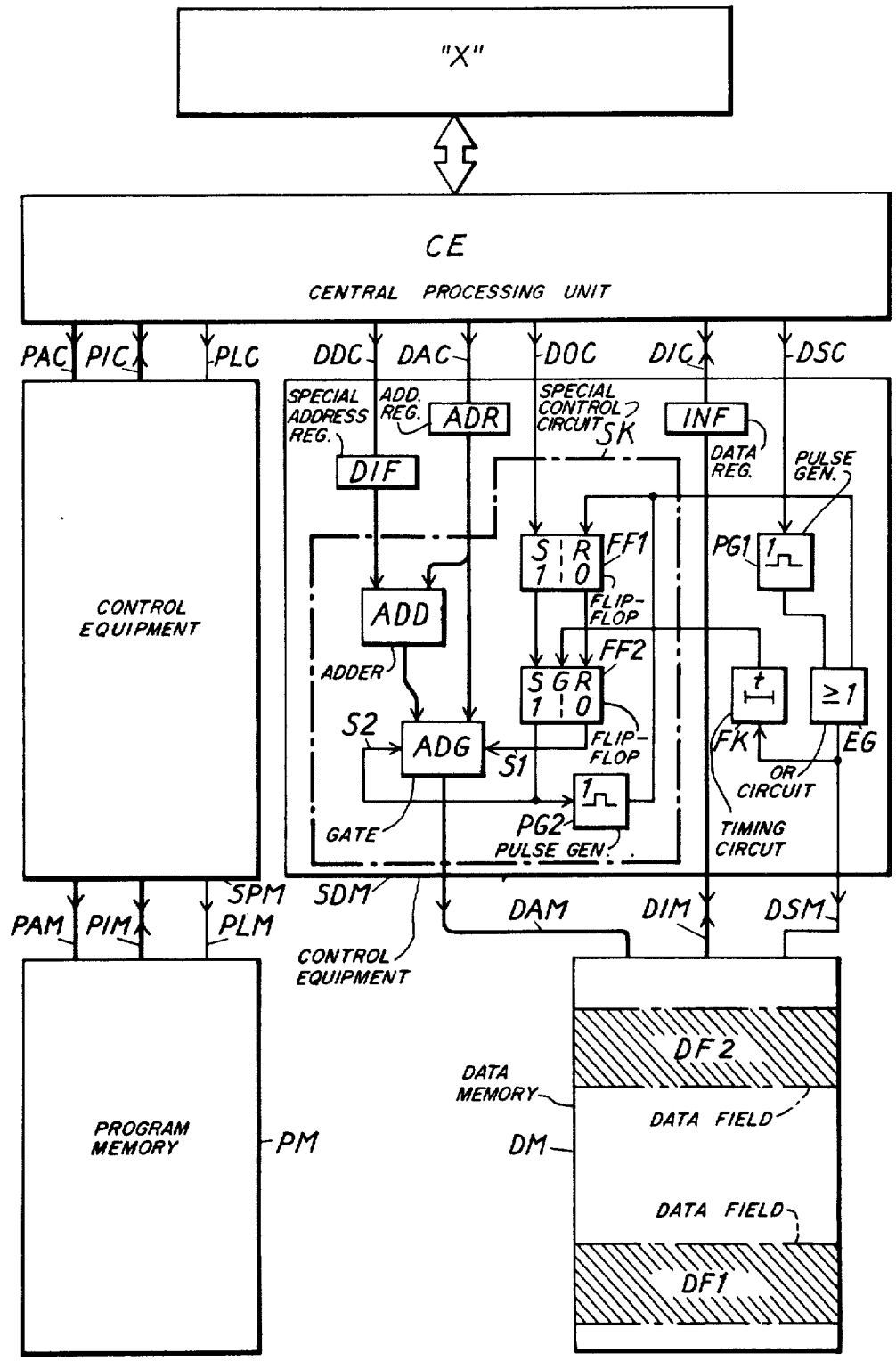

ARRANGEMENT FOR DOUBLE-WRITING INTO A MEMORY DURING DATA FIELD RELOCATION

The present invention relates to an arrangement for writing of identical data into a first and a second memory field in a real-time computer which, while in operation, performs relocation of data from the first memory field to the second one, said data memory is so arranged that, in response to a write pulse, data is transferred to a memory position defined by a simultaneously received address information.

The invention can be applied to e.g. a computer controlled telecommunication system, where information about various switching organs is stored in discrete memory fields, which are assigned to the respective organs. When an installation is being extended, the number of units within certain types of organs is increased, which creates the demand for rearranging the memory. The computer is loaded with a special low-priority program which relocates the data in the original memory field to a new memory field. This task is being interrupted by programs of a higher priority, such program sometimes issuing a write instruction directed to the memory field in the process of being relocated. There is a high probability then, that the memory position, to which the write instruction is being directed, has already been passed by the relocation program. Therefore, there must be some means for writing the data into both the original and the new memory field.

One method for solving the problem is to simply forbid the writing of new data, as long as the relocation is in progress. When the relocation is completed, the original memory field is erased and the new field addresses are to be used in place of the original ones. This method, however, is less desirable as it leads to a restricted system operation.

The Swedish patent application No. 17372/67 describes a method where the computer is given a further priority level, which is higher than all the other levels and is used by a special program for double writing of data. The computer jumps to this program, as soon as a lower level program generates a write instruction directed to the memory field which is in the process of being relocated. When the double writing is completed, the computer reverts to the thus interrupted program. However, the double-write program includes several instructions and thus adds to the computer load.

An object of the invention is to solve the presented problem without loading the computer, by means of an arrangement, which when the computer writes into a memory field in process of being relocated, autonomously converts the address and writes the same data into the new memory field.

The characteristics of the invention appear from the claims.

In the following specification reference is made to the accompanying drawing which shows an embodiment of the invention wherein only those items have been shown which are necessary for the explanation of the invention.

The sole FIGURE of the drawing shows a computer, including a central processing unit CE, a data memory DM and a program memory PM with associated control equipments SDM and SPM and a block "X", connected to the central processing unit, including e.g. switching organs belonging to a telecommunication system to be controlled by the computer in real time.

The switching organs are scanned cyclically in accordance with a control program in the program memory, data concerning the organs being stored in assigned data fields in the data memory. Changes within the block "X" or a changed working routine of the system call for relocation of data in the data memory, e.g. from an original data field DF 1 to a new one DF 2. This relocation is performed by means of a low priority program which means that the relocation is constantly interrupted by programs of higher priorities. A special control circuit SK and a special address register DIF, included in the control equipment SDM of the data memory, enable the same data to be written into both the original and the new fields when a program emits a write instruction directed to a data field which is being relocated.

In order to simplify the drawing, only those interconnections are shown between the various blocks, which concern the reading of program instructions from the program memory PM and the writing of data into the data memory DM. The central processing unit CE indicates the desired instruction by means of an address on output PAC, and a read command is delivered on another output PLC to the control equipment SPM. In response to signals on outputs PAM and PLM of control equipment SPM fed to program memory PM, the control equipment obtains the desired instruction on an input PIM, and delivers the same instruction to the central processing unit on an output PIC. Among other things, the control equipment includes registers for intermediate storage of the address received from central processing unit CE and the instruction read from program memory PM, circuits for translating the read command received from unit CE into a form suitable to memory PM and circuits for the adaptation to the memory cycle timing. All of these circuits are considered to be known, and further they are non-essential to the description of the invention. Similar circuits are included also in the control equipment SDM of the data memory DM, i.e. an address register ADR, a data register INF, a pulse circuit PG 1 and a timing circuit FK. In addition to this, however, a register DIF is included for the storage of extra address information, as will be described later, a control circuit SK which performs an extra write operation in the case when data is to be written into two memory fields, and an OR-circuit EG which collects write pulses from either the pulse circuit PG 1 or the control circuit SK to a common output DSM.

The control equipment receive address information from the central processing unit CE, in a well-known manner, via an address buss DAC to the address register ADR. Data is delivered on a data buss DIC to the data register INF, and a write command is received on an input DSC to a pulse circuit PG 1. In addition, the control circuit SK receives an indication on a special input DOC, each time the write command refers to an address position belonging to a memory field e.g. DF 1, which is being relocated. This means that the data recorded in the data register shall be written into both the addressed position and a corresponding position in another memory field, e.g. DF 2. This position in field DF 2 will be derived by means of address separation information, which has been transferred from the central processing unit CE to the register DIF via a separate address buss DDC, which is connected to the control circuit SK in the same manner as the register ADR. The address separation information had been recorded n register DIF at the start of the relocation process for indicating the value which must be added to an address, defining a certain position in the memory field DF 1, in order to create the address of the corresponding position in the memory field DF 2.

In accordance with the example, the control circuit SK includes a first bistable flip-flop FF 1 which forms a memory for storage of the indication received on input DOC, and a second bistable flip-flop FF 2, which forms a means for reading and effecting such indication. Further included are an add circuit ADD which derives a result address by adding the address separation stored in register DIF to the address stored in the register ADR, a gate device ADG which in accordance with control conditions from the second flip-flop FF2 either passes the address which is stored in the address register ADR or passes the result address which is derived by the adder ADD to an outgoing address buss DAM, and a device PG 2 which produces write pulses.

In order to explain the operation of the arrangement, first consider the normal case when no extra write operation is to be performed, which is characterized in that both flip-flops FF 1, FF 2 are "0"-set and that no indication is received on input DOC, when a write command is received on input DSC. As a result of the write command, the pulse circuit PG 1 produces a write pulse which passes the OR-circuit EG, from where it is transferred via output DSM to the data memory DM and further to the timing circuit FK.

The write pulse causes the data memory DM to fetch the information, which is stored in the data memory INF, via a data buss DIM, and to write this information into the position indicated by the address received on the address buss DAM. As the flip-flop FF 2 is "0"-set, the control input S 1 to the gate device ADG will be activated, and so the gate device will pass the address stored in the address register ADR on to the address buss DAM. After a certain time delay, corresponding to the write cycle of the data memory, the timing circuit FK will supply a clock pulse to an input G of flip-flop FF 2, in order to set the flip-flop to a position corresponding to the input condition on its inputs S, R. In accordance with the assumptions, however, the flip-flop FF 1 was "0"-set, and therefore no change will occur to FF 2.

If, on the next occasion, an indication is received on input DOC, besides the write command on input DSC, the flip-flop FF 1 will be "1"-set by the indication signal, and at the same time the write procedure described above will be initiated. After having written the information in the data register into a position in memory field DF 1, the flip-flop FF 2 thus receives a clock pulse on its input G, whereby the "1"-condition of the flip-flop FF 1 is transferred to FF 2. The gate device will now have its control input S 2 activated, and thereby the result address from the add circuit will be passed on to the address buss DAM, because the device pulse circuit PG 2 is being activated by the "1"-condition from FF 2. PG 2 then produces a write pulse, which resets the flip-flop FF 1 to "0" and at the same time is transferred to the output DSM, via the OR-circuit EG, and to the timing circuit FK. The data memory DM now performs a new write cycle, during which the information in the data register is written into the position in the memory field DF 2, defined by the result address from the add circuit ADD. When this write cycle is completed, a clock pulse is received from the timing circuit FK at input G of flip-flop FF 2, which causes of flip-flop FF 2 to accept the state of flip-flop FF 1, i.e. "0". Thus the control circuit SK is brought back to its start condition, and it is ready for a new write cycle according to either of the described sequences.

We claim:

1. In a real-time computer, which, while in operation, performs the relocation of data in a memory from a first to a second memory field wherein the memory has means activated by a write pulse for writing data into a memory position defined by received address information, apparatus for writing identical data, stored in a data register, into both of said first and second memory fields during said relocation, said apparatus comprising: a first address register for storing a primary address belonging to said first memory field; a second address register for storing the address separation between said first and second memory fields; and a control circuit comprising an adder means provided with a first input connected to said first address register and a second input connected to said second address register, said adder means having means for producing a result address by adding said address separation to said primary address, a gate device having a first input for receiving said result address, a second input connected to said first address register and an output connected to said memory, a recording means for storing a relocation indication, and control means for controlling the transfer in a determined order of said primary address and said result address from said gate device to said memory, said control means including means for supplying to the memory an additional write pulse when said indication is present.

2. Arrangement in accordance with claim 1 wherein said determined order is such that said result address is obtained after said primary address.

3. Arrangement in accordance with claim 1 wherein said determined order is such that said result address is obtained before said primary address.

* * * * *